(12) United States Patent
Bening et al.

(10) Patent No.: US 6,730,745 B2
(45) Date of Patent: May 4, 2004

(54) PROCESS FOR COUPLING STYRENIC BLOCK COPOLYMERS

(75) Inventors: Robert C. Bening, Katy, TX (US); Carl L. Willis, Houston, TX (US)

(73) Assignee: Kraton Polymers U.S. LLC, Houston, TX (US)

(*) Notice: Subject to any disclaimer, the term of this patent is extended or adjusted under 35 U.S.C. 154(b) by 0 days.

(21) Appl. No.: 10/257,881

(22) PCT Filed: Apr. 12, 2001

(86) PCT No.: PCT/US01/12074
§ 371 (c)(1), (2), (4) Date: Feb. 3, 2003

(87) PCT Pub. No.: WO01/79319
PCT Pub. Date: Oct. 25, 2001

(65) Prior Publication Data
US 2003/0212214 A1 Nov. 13, 2003

Related U.S. Application Data
(60) Provisional application No. 60/197,966, filed on Apr. 17, 2000.

(51) Int. Cl.⁷ .............................. C08F 297/04
(52) U.S. Cl. ............... 525/256; 525/271; 525/314; 525/316
(58) Field of Search ............... 525/256, 271, 525/314, 316

(56) References Cited

U.S. PATENT DOCUMENTS

| | | |
|---|---|---|
| 3,134,745 A | 5/1964 | Dennis |
| 3,468,972 A | 9/1969 | Hsieh |
| 3,595,941 A | 7/1971 | Farrar et al. |
| 3,635,891 A | 1/1972 | Lubowitz et al. |
| 3,652,723 A | 3/1972 | Fellers et al. |
| 4,096,203 A | 6/1978 | St. Clair |
| 5,461,095 A | 10/1995 | Van Dongen et al. ...... 524/100 |

FOREIGN PATENT DOCUMENTS

| | | |
|---|---|---|
| WO | WO99/01490 | 1/1999 |

*Primary Examiner*—Jeffrey Mullis

(57) ABSTRACT

Disclosed is a process for coupling styrenic block copolymers comprising admixing vinyl cyclohexene dioxide with a living block copolymer comprising at least one block of polymerized vinyl aromatic hydrocarbon monomers and at least one block of polymerized conjugated diene monomers, at a molar ratio of from 0.40 to 0.60 and carrying out a coupling reaction at a temperature of at least 65° C. to produce a coupled styrenic block copolymer. Also disclosed is a polymer composition comprising at most 30% by weight of a styrenic block copolymer comprising at least one block A of polymerized vinyl aromatic monomer(s) and at least one block B of polymerized conjugated diene(s) and at least 70% by weight of the styrenic block copolymer coupled with vinyl cyclohexene dioxide.

9 Claims, No Drawings

PROCESS FOR COUPLING STYRENIC BLOCK COPOLYMERS

This application is a 371 of PCT/US01/12074, filed Apr. 12, 2001 which claims the benefit of provisional application 60/197,966, filed Apr. 17, 2000.

FIELD OF THE INVENTION

This invention relates to a method for producing styrenic block copolymers wherein living block copolymer chains are linked together by utilizing a linking compound which has at least two functional groups. More particularly, the present invention relates to a method for achieving high efficiency coupling of styrenic block copolymers by using 4-vinyl-1-cyclohexene diepoxide as the linking compound to couple two living block copolymer chains together.

BACKGROUND OF THE INVENTION

The production of styrene-diene-styrene triblock copolymers by coupling of the styrene-diene diblock is well known and has a number of advantages over the production of corresponding polymers by fully sequential polymerization. Higher overall rates are achieved and more symmetrical styrene blocks are formed since the coupling process avoids the crossover problem encountered when initiating a third styrene block in the fully sequential polymerization method. Styrene block symmetry is important to a number of physical properties including tensile strength.

A large number of organic compounds have been reported as useful as coupling agents for such block copolymers. The most commonly used coupling agent for the production of linear polymers is dibromoethane. Coupling efficiencies in the 80 to 85 percent range can easily be achieved with dibromoethane and the products have excellent melt viscosity stability. However, these products discolor after aging at elevated temperature due to the presence of lithium bromide. Other coupling agents, including methyl formate and a variety of silanes, are known to produce color stable linear polymers with reasonably high coupling efficiency but most of the products exhibit significantly lower melt viscosity stability.

U.S. Pat. No. 5,461,095 describes coupled polymers which are said to have a high coupling efficiency, good melt stability, and also good color stability. These polymers are said to have been produced by using aromatic epoxy compounds such as high purity, high diepoxy content, diglycidyl ether of bisphenol A (DGEBA) epoxy resins as the coupling agent. EPON® 825 resin from Shell Chemical Company is one example of this class of resins. Unfortunately, these aromatic epoxies have very low solubility in the aliphatic hydrocarbon solvents generally used for anionic polymerization of styrene-diene block copolymers, such as cyclohexane. One consequence of this is that efficient coupling is hard to achieve without vigorous mixing. These aromatic epoxy resins also tend to be quite viscous, making precise metering, which is a requirement for high coupling efficiency, more difficult and, since the solubility is low, dilution with a process solvent is not an option.

WO 99/01490 describes the use of glycidyl ethers of aliphatic polyalcohols as coupling agents. While these materials have a lower viscosity and good solubility in hydrocarbon solvents, commercially available grades are contaminated with high levels of monoepoxy and hydroxylic material. Purification by an expensive vacuum distillation is required before high coupling efficiency can be achieved.

4-vinyl-1-cyclohexene diepoxide (VCHD) is a low viscosity, hydrocarbon soluble diepoxy compound that is commercially available in very high purity (high diepoxy content). However, it has generally been considered too unreactive to be of use in the production of linear comparative test V6,4-vinyl-1-cyclohexene diepoxide was used to couple a living polybutadiene polymer at 50° C. The coupling yield was only 50.7%. In most applications, it is desirable for the coupling efficiency to be at least 70%, preferably close to 80%.

It can be seen that there is a need for a coupling agent for styrene-diene block copolymers which will give a high coupling efficiency and also produce products which are highly melt stable and have good color stability, and also exhibits relatively good solubility in aliphatic hydrocarbon solvents. The present invention provides such a coupling agent and a process for achieving high coupling efficiency.

SUMMARY OF THE INVENTION

In one aspect, the present invention is a process for coupling styrenic block copolymers comprising admixing vinyl cyclohexene dioxide with a living block copolymer comprising at least one block of polymerized vinyl aromatic hydrocarbon monomers and at least one block of polymerized conjugated diene monomers, at a molar ratio of from 0.40 to 0.60 and carrying out a coupling reaction at a temperature of at least 65° C. to produce a coupled styrenic block copolymer.

In another aspect, the present invention is a polymer composition comprising at most 30% by weight of a styrenic block copolymer comprising at least one block A of polymerized vinyl aromatic monomer(s) and at least one block B of polymerized conjugated diene(s) and at least 70% by weight of the styrenic block copolymer coupled with vinyl cyclohexene dioxide.

This invention is a process for coupling styrenic block copolymers utilizing 4-vinyl-1-cyclohexene diepoxide (VCHD) as the coupling agent. First, styrene or another vinyl aromatic hydrocarbon is anionically polymerized to produce a living styrene polymer block of desired molecular weight. Next, a diene, such as butadiene or isoprene, is anionically polymerized onto the living end of the styrene polymer block. This polymerization is carried out such that the diene block has a molecular weight of one-half of the desired molecular weight of the final polymer. Next, 4-vinyl-1-cyclohexene diepoxide is added to the reaction mixture at a mole ratio of from 0.40 to 0.6, preferably 0.5 to 0.55, moles of 4-vinyl-1-cyclohexene diepoxide per mole of polymer, and the reaction is carried out at a temperature of at least 65° C., preferably 75° C. to 95° C., for at least 15 minutes, preferably at least 30 minutes.

It would be desirable in the art of preparing coupled styrene-diene block copolymers to prepare such copolymers using a process which has a high coupling efficiency. It would also be desirable in the art of preparing such copolymers if the copolymers could be used as or to prepare pressure sensitive adhesives and hot melt adhesives.

DETAILED DESCRIPTION OF THE INVENTION

As is well known, polymers containing both aromatic and ethylenic unsaturation can be prepared by copolymerizing one or more diolefins, particularly a diolefin, such as butadiene or isoprene, with one or more alkenyl aromatic hydrocarbon monomers, such as styrene. The copolymers may, of course, be random, tapered, block or a combination of these, in this case block. The products of this invention are preferably mixtures of at least 70% A-B-A triblocks, the remainder being A-B diblock, prepared by coupling A-B diblock copolymers, in which the terminal monomer unit of the B block is derived from isoprene or butadiene. The two resulting polymers may also be blended with other diblock or triblock polymers or with star or radial polymers, i.e. polymers of the general structure $(A-B)_n-X$, where n is greater than 2. Mixed polymer structures can also be made by coupling with a mixture of 4-vinyl-1-cyclohexene diepoxide and other coupling agents.

Polymers of conjugated diolefins and copolymers of one or more conjugated diolefins and one or more alkenyl aromatic hydrocarbon monomers are frequently prepared in solution using anionic polymerization techniques. In general, when solution anionic techniques are used, these block copolymers are prepared by contacting the monomers to be polymerized simultaneously or sequentially with an organoalkali metal compound in a suitable solvent at a temperature within the range from about −150° C. to about 300° C., preferably at a temperature within the range from about 0° C. to 100° C. Particularly effective anionic polymerization initiators are organolithium compounds having the general formula:

$$RLi_n$$

Wherein:

R is an aliphatic, cycloaliphatic, aromatic or alkyl-substituted aromatic hydrocarbon radical having from 1 to about 20 carbon atoms; and n is an integer of 1 to 4.

The molar ratio of the initiator to the monomer determines the block size, i.e. the higher the ratio of initiator to monomer the smaller the molecular weight of the block. For products in the molecular weight range of interest, this generally leads to an initiator concentration in the range of about 0.25 to about 50 millimoles per 100 grams of monomer. The monomer concentration (solids) is generally dictated by the limitations placed on the viscosity of the resulting polymer solution and heat removal during the polymerization. Polymerization solids are generally in the range of 5 percent by weight (% wt) and 50% wt, preferably, 20% wt and 40% wt.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, zylene and the like; hydrogenated aromatic hydrocarbons such as tetralin, decalin and the like. Further, polar cosolvents may be used. Suitable cosolvents include linear and cyclic ethers such as methyl, ether, methyl ethyl ether, tetrahydrofuran and the like, and mixture of such ethers.

As described in U.S. Pat. No. 4,096,203 the disclosure of which is herein incorporated by reference, usually the styrene is contacted with the initiator. Next, the living polymer in solution is contacted with isoprene or another diene. The resulting living polymer has a simplified structure A-B-Li. It is at this point that the living polymer is coupled with a coupling agent.

In the prior art, such as that exemplified by U.S. Pat. Nos. 3,595,941 and 3,468,972, the disclosures of which are herein incorporated by reference, the effort was always made to select the particular coupling agent or reaction conditions that resulted in the highest coupling efficiency. High coupling efficiencies are desired herein as well in order to produce more A-B-A polymer. Coupling efficiency is defined as the number of molecules of coupled polymer divided by the number of molecules of coupled polymer plus the number of molecules of uncoupled polymer. In the present invention, the use of 4-vinyl-1-cyclohexene diepoxide as the coupling agent allows a coupling efficiency of at least 70 percent to be achieved.

$$\frac{\text{\# of molecules of } (SI)_2}{\text{\# of molecules of } (SI)_2 \text{ plus } SI}$$

Coupling efficiency is usually determined by gel permeation chromatography (GPC).

It is not sufficient to achieve the desired result of the present invention to merely use 4-vinyl-1-cyclohexene diepoxide as the coupling agent. The coupling process must be carried out under specified conditions. First, the temperature of the coupling reaction must be maintained at at least 65° C. and preferably at 75 to 95° C. If the temperature is lower than 65° C. then the coupling efficiency which can be achieved is much lower, i.e., such as the 50 percent coupling efficiency which was achieved in WO 99/01490. The temperature probably should not be higher than 95° C. because thermal termination of some of the living polymer blocks may occur prior to coupling.

The coupling reaction is preferably carried out for at least 15 minutes and preferably at least 30 minutes. If the coupling reaction time is less than 15 minutes, then the overall coupling efficiency goal will not be achieved. It is probably not necessary to carry out the coupling reaction for more than 60 minutes because the small additional coupling that takes place is not justified by the cost of the increased time of reaction.

Finally, it is important to achieve the correct stoichiometry. Ideally, it would be expected that the maximum coupling efficiency would be achieved for a difunctional coupling agent when the molar ratio of the coupling agent to the polymeric lithium anions is exactly 0.5. In practice, there may be side reactions that not only limit the maximum achievable coupling, but also influence this ratio. In the case of 4-vinyl-1-cyclohexene diepoxide, it is preferable to err on the side of excess diepoxide. Coupling efficiencies of at least 70% can be achieved if this ratio is between 0.40 and 0.6; high coupling efficiencies are most reliably achieved when this ratio is between 0.5 and 0.55.

Following the coupling reaction or when the desired coupling efficiency has been obtained, the product is neutralized such as by the addition of terminators, e.g., hydrogen, water, alcohol or other reagents, for the purpose of terminating residual active anions. The product is then recovered such as by coagulation utilizing hot water or steam or both.

The coupled polymer is then finished and shipped off to the end user. The polymer is then combined with other components to form whatever end use composition is desired.

EXAMPLES

The polymers made were homopolymers of butadiene or isoprene. The following polymerizations were carried out in a two-liter Buchi glass autoclave reactor according to the following general procedure. The desired cyclohexane solvent charge was added, followed by 100 grams of monomer and any modifiers or cosolvents desired to be present during polymerization. The solvent charge was adjusted such that the reactor contents at the end of polymerization would not exceed 1000 grams. A Lauda bath was used to apply heating and cooling to the reactor jacket. The reactor contents were then heated to the initiation temperature, usually 40° C. Once the initiation temperature was reached, the desired quantity of s-butyl lithium was added and 44 grams of dry cyclohexane were flushed to ensure complete transfer. If the polymerization was being run at 20 percent solids, a second 100 grams charge of monomer was added when the exothermic temperature rise peaked. When the exothermic temperature rise from the final monomer charge had peaked, the bath temperature was set to the desired temperature for coupling. The 4-vinyl-1-cyclohexene diepoxide coupling agent was added when the reactor had reached the desired temperature and the polymerization had been allowed to proceed for at least eight half-lives. 4-Vinyl-1-cyclohexene diepoxide was obtained from Union Carbide (ERL-4206) and used as received or dried over 4A molecular sieves. The coupling agent was added as a 10 percent weight solution in dry cyclohexane and 44 grams of dry cyclohexane was flushed through to ensure complete transfer. At the end of the coupling reaction, methanol (1 mole per mole of s-butyl lithium) was added and the reactor contents were transferred to a glass bottle for storage.

Reactions in which the coupling temperature was greater than 85° C. were carried out in a one-liter stainless steel ZipperClave (Autoclave Engineers) autoclave reactor equipped with electronic heating. The total weight charged at the end of the polymerization was adjusted to 625 grams. The initiation temperature was increased to 65° C. without incurring too great of an exothermic temperature increase due to the improved heat transfer in the reactor. Otherwise, the polymerizations were carried out as above.

Some experiments were carried out in a larger reaction facility. The polymerizations were carried out according to the same general procedure as above. However the target molecule in these experiments was a high molecular weight Styrene-Isoprene-Styrene triblock copolymer. First, polystyryllithium of a number average molecular weight of about 10,800 amu was prepared by contacting styrene and s-butyllithium in cyclohexane. Isoprene and cyclohexane were charged into a second reactor, and then a portion of the polystyryllithium solution was transferred to the second reactor. The amount of isoprene and polymer was chosen so that the resulting diblock would have an overall number average molecular weight of about 67,000 amu and a polystyrene content of about 15% wt, and the solids at the end of the reaction would be about 20% wt. The coupling agent was added neat, after the isoprene polymerization was complete.

Example 1

Living polyisoprene homopolymer molecules were reacted with 4-vinyl-1-cyclohexene diepoxide at a ratio of about 0.5 moles of coupling agent per mole of living polymer at temperatures between 50° C. and 95° C. in cyclohexane. In all of the examples, samples were taken 15, 30, and 60 minutes after the coupling agent was added. In some cases, the reactions were allowed to proceed for a total of 4 hours, and samples were taken every hour. The results are summarized in Table 1 below. The Coupling Agent: Polymer-Li ratios in the table below represent the average of values obtained using the charge data and (1) the number of average molecular weight ($M_n$) as determined by GPC, (2) the number average molecular weight ($M_n$) as determined by $^1$H Nuclear Magnetic Resonance (NMR), and (3) the diepoxy: s-butyl ratio determined directly by $^1$H NMR.

TABLE 1

| Run # | Molecular Weight | Temp (° C.) | Reaction Time (min) | CA:PLi | Observed CE |
|---|---|---|---|---|---|
| 23838-168 | 10,000 | 50 | 60 | 0.54 | 49% |
| 24372-15 | 10,000 | 75 | 60 | 0.58 | 77% |
| 24372-19 | 10,000 | 75 | 60 | 0.59 | 76% |
| 24372-23 | 10,000 | 75 | 60 | 0.58 | 78% |
| 24372-25 | 10,000 | 75 | 60 | 0.59 | 74% |
| 24372-37 | 10,000 | 75 | 60 | 0.42 | 77% |
| 24372-39 | 10,000 | 75 | 60 | 0.49 | 78% |
| 24372-41 | 10,000 | 75 | 60 | 0.48 | 76% |
| 24372-35 | 1,500 | 75 | 60 | 0.50 | 85% |
| 24372-49 | 2,500 | 75 | 30 | 0.42 | 74% |
| 24372-51 | 2,500 | 75 | 15 | 0.49 | 67% |
| 24372-61 | 2,500 | 75 | 240 | 0.46 | 78% |
| 24372-81 | 2,500 | 85 | 240 | 0.45 | 81% |
| 24372-103 | 2,500 | 95 | 240 | 0.52 | 81% |

It can clearly be seen that coupling efficiencies within the desire range can be achieved by carrying out the reaction at temperatures higher than 50° C. for at least 15 minutes with coupling agent: polymeric lithium ratios in the range of 0.45–0.6. Close inspection of the data reveals that coupling efficiencies on the high end of the range (77%–78%) were obtained at ratios as high as 0.58.

The change in coupling efficiency as a function of time at 75° C., 85° C., and 95° C. is summarized in Table 2 below. At all temperatures examined, the majority of coupling occurs in the first 15 minutes. At 85° C. and 95° C., the reaction is essentially complete after 30 minutes.

TABLE 2

| Run # | Temperature (° C.) | CA:PLi | Reaction Time (min.) | Observed CE |
|---|---|---|---|---|
| 24372-61 | 75 | 0.46 | 1 | 54% |
| | | | 5 | 66% |
| | | | 20 | 74% |
| | | | 30 | 75% |
| | | | 60 | 77% |
| | | | 120 | 78% |
| | | | 180 | 78% |
| | | | 240 | 78% |
| 24372-81 | 85 | 0.45 | 1 | 63% |
| | | | 5 | 75% |
| | | | 15 | 79% |
| | | | 30 | 80% |
| | | | 60 | 81% |
| | | | 120 | 81% |
| | | | 180 | 81% |
| | | | 240 | 81% |
| 24372-103 | 95 | 0.52 | 1 | 64% |
| | | | 5 | 80% |
| | | | 15 | 81% |
| | | | 30 | 82% |
| | | | 60 | 82% |
| | | | 120 | 82% |
| | | | 240 | 81% |

The runs described in Table 3 were for styrene-isoprene-styrene block copolymers and were carried out in the larger facility. Due to the high molecular weight of the products, we were unable to directly determine the Coupling Agent: Polymer-Li ratio by $^1$H NMR. The values reported here were calculated from the charges and the relevant molecular weights as determined by GPC.

TABLE 3

| Run # | CA:PLi | Temp (° C.) | Observed CE |
|---|---|---|---|
| 7328D | 0.50 | 75 | 80% |
| 7333D | 0.49 | 75 | 76% |
| 7333D | 0.49 | 75 | 79% |
| 7340D | 0.50 | 65 | 78% |
| 7344D | 0.48 | 85 | 79% |
| 7368D | 0.42 | 75 | 70% |
| 7555M | 0.49 | 75 | 74% |

All of these experiments were carried out at temperatures within the temperature range of the present invention. Also, the coupling agent to living chain end molar ratios were within the range of the present invention. In each case, a coupling efficiency of at least 70% was achieved. Clearly, products typical of commercial styrenic block copolymers can be prepared using this technology.

Example 2

Several more polymerizations were carried out using polar cosolvent which are often used in the polymerization of styrene-diene block copolymers. In these example, o-dimethoxy benzene (ODMB), diethoxy propane (DEP), and diethyl ether (DEE) were used as modifiers in the polymerizations. Isoprene or butadiene were polymerized to a number average molecular weight of about 10,000 in cyclohexane. Next, the vinyl cyclohexene diepoxide was added. The reactions were carried out at 65° C. and 75° C. for 60 minutes. The results are shown in Table 4 below. The coupling data for the polybutadiene in cyclohexane was consistent with that which was observed for polyisoprene in the previous examples.

TABLE 4

| Run # | Terminal Monomer | Modifier | Temp (° C.) | CA/PLi | Coupling Efficiency |
|---|---|---|---|---|---|
| 24372-33 | Isoprene | 400 PPM ODMB | 75 | 0.50 | 72% |
| 24372-47 | Isoprene | 300 PPM DEP | 75 | 0.51 | 75% |
| 24372-31 | Butadiene | None | 75 | 0.50 | 70% |
| 24372-57 | Butadiene | 6% DEE | 65 | 0.48 | 79% |

Example 3

The product of Run @7555 was finished in a pilot-scale hot water coagulator. The resulting crumb was further dried under vacuum at 40° C. for about one week. Samples were also produced by either drying the as received cement from Run @7555 at about 40° C. under vacuum overnight, or adding 0.1% wt deionized water to the cement prior to drying. In the hot water coagulated sample, roughly ⅓ of the lithium is expected to be extracted from the polymer. The samples recovered by drying the cement will contain all of the lithium. In the case where water is added, the majority of the lithium is expected to be converted to hydroxide or carbonate prior to exposure of the sample to heat.

The melt viscosity stability and high temperature color stability was assessed as follows. Samples of the dry polymer were formulation into adhesives of the following composition:

25% wt Polymer

60% wt Escorex® 5300 tackifying resin

15% wt Tufflo® oil 2 phr Irganox® 1010 antioxidant wherein phr means parts per hundred parts of rubber.

The adhesives were heated in an oven and exposed to air at 350° F. (177° C.) for the time period noted in the tables below. The viscosity was measured at 177° C. using a Brookfield rheometer and the color was assessed using the Gardner method. The results are summarized in Tables 5 and 6. Comparative Examples A and B represent typical data for the same type of polymer coupled with a DGEBA epoxy (EPON® 825 resin) and ethylene dibromide (EDB), respectively. The melt viscosity stability is a measure of how well the polymer's structure remains intact at high temperatures. The melt stability of the VCHD coupled product is clearly comparable to that of the EPON® 825 resin and EDG coupled products. Further, the high temperature color stability is comparable to that of the EPON® 825 resin coupled product, and clearly superior to that of the EDB coupled material.

TABLE 5

| | Viscosity (Centipoise/Pa · s) & Percent Change After: | | | | | | |
|---|---|---|---|---|---|---|---|
| | Initial | 8 Hours | | 24 Hours | | 48 Hours | |
| Sample | Viscosity | Viscosity | Decrease | Viscosity | Decrease | Viscosity | Decrease |
| 7555 (Coagulated) | 4790/4.79 | 4032/4.03 | 16% | 2438/2.44 | 49% | 1180/1.18 | 75% |
| 7555 (Lab Dried) | 5520/5.52 | 4952/4.95 | 10% | 2925/2.92 | 47% | 950.0/0.95 | 83% |
| 7555 (0.1% H$_2$O Lab Dried) | 5210/5.21 | 4315/4.32 | 17% | 2670/2.67 | 49% | 992/0.99 | 81% |
| Comparative Example A | 7560/7.56 | 6470/6.47 | 14% | 2490/2.49 | 67% | 1180/1.12 | 84% |
| Comparative Example B | 6350/6.35 | 5370/5.37 | 15% | 2920/2.92 | 54% | 680/0.68 | 89% |

TABLE 6

| | Gardner Color After: | | | | |
|---|---|---|---|---|---|
| Sample | Initial | 8 Hours | 24 Hours | 48 Hours | 96 Hours |
| 7555 (Coagulated) | 1 | 3 | 5 | 8 | 10 |
| 7555 (Lab Dried) | 1 | 2 | 4 | 7 | 10 |
| 7555 (0.1% H$_2$O Lab Dried) | 1 | 1 | 3 | 6 | 9 |
| Comparative Example A | 1 | 2 | 3 | 5 | 7 |
| Comparative Example B | 1 | 4 | 9 | 14 | 15 |

We claim:

1. A process for coupling styrenic block copolymers comprising admixing vinyl cyclohexene dioxide with a living block copolymer comprising at least one block of polymerized vinyl aromatic hydrocarbon monomers and at least one block of polymerized conjugated diene monomers, at a molar ratio of from 0.40 to 0.60 and carrying out a coupling reaction at a temperature of at least 65° C. to produce a coupled styrenic block copolymer.

2. The process of claim 1 wherein the coupling reaction is carried out for at least 15 minutes.

3. The process of claim 1 wherein the solvent is a mixture of hydrocarbon solvent and a polar cosolvent.

4. The process of claim 1 wherein the molar ratio is 0.5 to 0.55.

5. The process of claim 1 wherein the temperature is from 75 to 95° C.

6. The process of claim 1 wherein the coupling reaction is carried out for at least 30 minutes.

7. The process of claim 1 wherein an A-B-A triblock copolymer is prepared by coupling an A-B diblock copolymer.

8. The process of claim 7 wherein the terminal monomer unit of the B block is derived from isoprene or butadiene.

9. A polymer composition comprising at most 30% by weight of a styrenic block copolymer comprising at least one block A of polymerized vinyl aromatic monomer(s) and at least one block B of polymerized conjugated diene(s) and at least 70% by weight of the styrenic block copolymer coupled with vinyl cyclohexene dioxide.

* * * * *